United States Patent
Yu

(10) Patent No.: US 11,648,098 B2
(45) Date of Patent: May 16, 2023

(54) PORTABLE ORAL IRRIGATOR

(71) Applicant: Lei Yu, Guangdong (CN)

(72) Inventor: Lei Yu, Guangdong (CN)

(73) Assignee: Shenzhen Yuxinyuan Electronic Technology Co., Ltd., Shenzhen (CN)

( * ) Notice: Subject to any disclaimer, the term of this patent is extended or adjusted under 35 U.S.C. 154(b) by 405 days.

(21) Appl. No.: 17/095,778

(22) Filed: Nov. 12, 2020

(65) Prior Publication Data
US 2021/0059801 A1 Mar. 4, 2021

(51) Int. Cl.
*A61C 17/02* (2006.01)
*A61C 17/024* (2006.01)

(52) U.S. Cl.
CPC ...... *A61C 17/0202* (2013.01); *A61C 17/0205* (2013.01); *A61C 17/024* (2019.05)

(58) Field of Classification Search
CPC .............. A61H 13/005; A61C 17/0202; A61C 17/0205; A61C 17/024; A61C 17/028; A61C 17/02; A61C 17/0208
USPC ......................................................... 601/162
See application file for complete search history.

(56) References Cited

U.S. PATENT DOCUMENTS

| | | | | |
|---|---|---|---|---|
| 6,030,215 A | * | 2/2000 | Ellion | A46B 11/001 222/324 |
| 6,689,078 B1 | * | 2/2004 | Rehkemper | A61C 17/30 433/80 |
| 2008/0008979 A1 | * | 1/2008 | Thomas | A61C 17/028 433/80 |
| 2014/0154640 A1 | * | 6/2014 | Mok | A61C 1/0092 433/89 |
| 2014/0227659 A1 | * | 8/2014 | Thomas | A61C 17/0205 433/80 |

* cited by examiner

*Primary Examiner* — Amy R Weisberg

(57) ABSTRACT

A portable oral irrigator includes a nozzle, a handle, an outer water container and an inner water container. The nozzle is at an upper end of the portable oral irrigator. The handle is below the nozzle. The outer water container is below the handle. The inner water container is below the outer water container. A sealing ring is at a bottom of the inner water container for sealing the inner water container. An annular silicone sealing member is at a joining portion of the outer water container and the inner water container. A gasket is between the outer water container and the handle. An air passable silicone seal is on the gasket. With provision of the air passable silicone seal, a raised bottom of the air passable silicone seal contracts to close its cross-shaped opening due to water pressure in the outer water container, thereby preventing leakage.

8 Claims, 6 Drawing Sheets

PORTABLE ORAL IRRIGATOR

BACKGROUND OF THE INVENTION

1. Field of the Invention

The invention relates to oral hygiene instruments and more particularly to a portable oral irrigator having improved characteristics.

2. Description of Related Art

Currently, oral hygiene is widely concerned by people. Thus, a wide variety of products for keeping one's mouth clean and free of disease and other problems have been commercially available.

Conventionally, an oral irrigator is one of the oral hygiene products. The oral irrigator is an auxiliary tool for cleaning the teeth. It is a tool for flushing pressurized water on the teeth and rinsing out the food residue between the teeth. The oral irrigator generally includes a housing and a nozzle mounted on a front end of the housing. In use, pressurized water exits the nozzle in high speed. However, the conventional oral irrigator has many structural disadvantages including the leakage prevention arrangement of the housing being a closed water path, electrical devices being exposed and adjacent to the water path, leakage being prone and in turn damaging the electrical circuits, and posing a safety threat to a user.

Thus, a portable oral irrigator is provided to solve the above problems.

SUMMARY OF THE INVENTION

The invention has been made in an effort to solve the problems of the conventional art discussed in the above paragraph of related art by providing a portable oral irrigator having an excellent leakage prevention arrangement.

To achieve above and other objects of the invention, the invention provides a portable oral irrigator comprising a nozzle; a handle; an outer water container; an inner water container wherein the nozzle is disposed at an upper end of the portable oral irrigator, the handle is disposed below the nozzle, the outer water container is disposed below the handle, and the inner water container is disposed below the outer water container; a sealing ring disposed at a bottom of the inner water container for sealing the inner water container; an annular silicone sealing member disposed at a joining portion of the outer water container and the inner water container; a gasket disposed between the outer water container and the handle; and an air passable silicone seal disposed on the gasket.

Preferably, further comprises a sealing cap at a joining portion of the nozzle and the handle wherein an inner rim of the sealing cap is provided with silicone to prevent leakage.

Preferably, the handle includes a curved portion on an outer surface, the curved portion has an anti-slip particles design to increase the friction between the hand and the device; a push button assembly on the handle opposite to the curved portion, the push button assembly having from 3 to 5 push buttons of different functions; and a plurality of indicators below the push button assembly on the handle.

Preferably, the push button assembly has from 3 to 5 push buttons of different functions and the indicators include 5 LEDs of different colors based on operating states and pressure values of the portable oral irrigator.

Preferably, further comprises an annular electroplated member on a top of the sealing ring for joining together the sealing ring and the inner water container.

Preferably, further comprises a water inlet cap on an outer surface of the inner water container, the water inlet cap being hingedly secured to the outer surface of the inner water container; and a silicone O-ring at a joining portion of the water inlet cap and the inner water container, the silicone O-ring being disposed on an inner surface of the water inlet cap.

Preferably, a bottom of the air passable silicone seal is raised to shape as a dome, the air passable silicone seal includes a cross-shaped opening on the raised bottom, and thickness of the air passable silicone seal is calculated from an edge to a center and is gradually decreased.

Preferably, further comprises four sets of air troughs on an inner surface of the outer water container wherein two adjacent sets of the air troughs are spaced apart by 90-degree.

The portable oral irrigator of the invention has the following advantageous effects in comparison with the prior art: with the provision of the air passable silicone seal, a raised bottom of the air passable silicone seal contracts to close its cross-shaped opening due to water pressure in the outer water container, thereby preventing leakage. Further, with the provision of the silicone sealing member, after adding water to both the outer water container and the inner water container and as a structural characteristic of the silicone sealing member, the annular Y-shaped groove on a top of the silicone sealing member expands due to water pressure, and the expanded silicone sealing member adheres to a plastic inner surface of the outer water container to prevent leakage.

The above and other objects, features and advantages of the invention will become apparent from the following detailed description taken with the accompanying drawings.

DETAILED DESCRIPTION OF THE INVENTION

Figure 1:
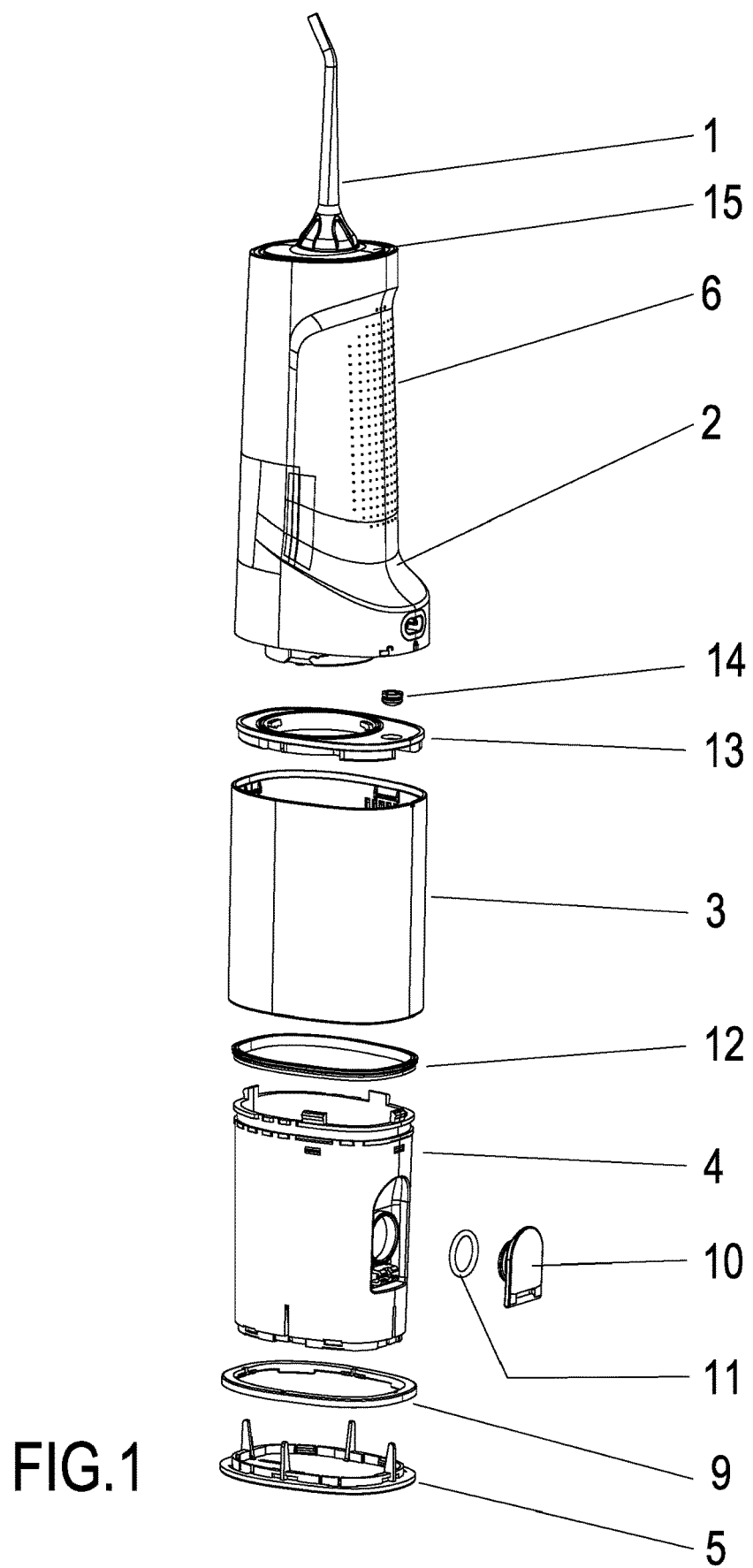
FIG. 1 is ax exploded view of a portable oral irrigator according to the invention.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail.

Figure 2:
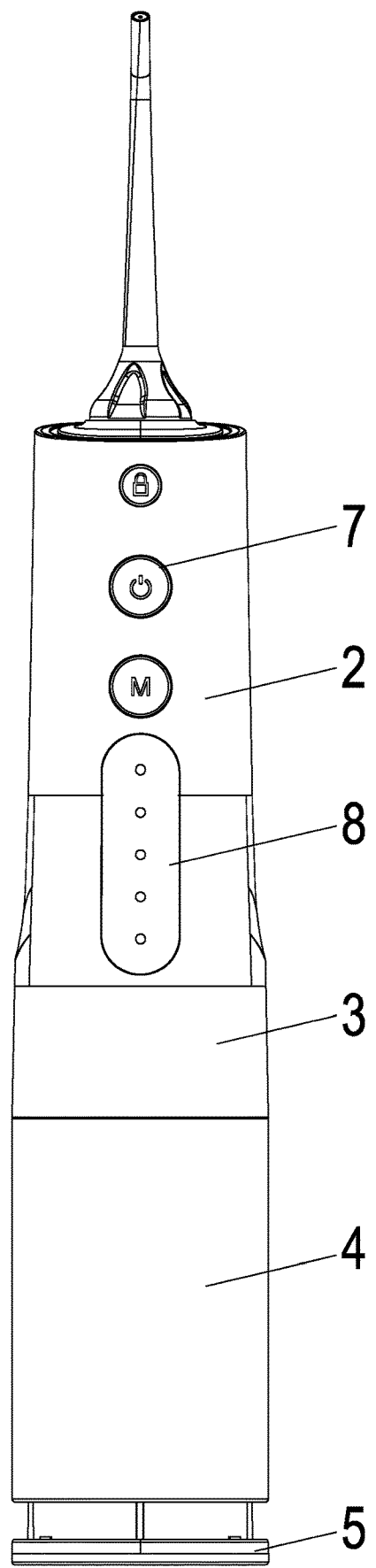
FIG. 2 is a perspective view of the assembled portable oral irrigator.
Figure 3:
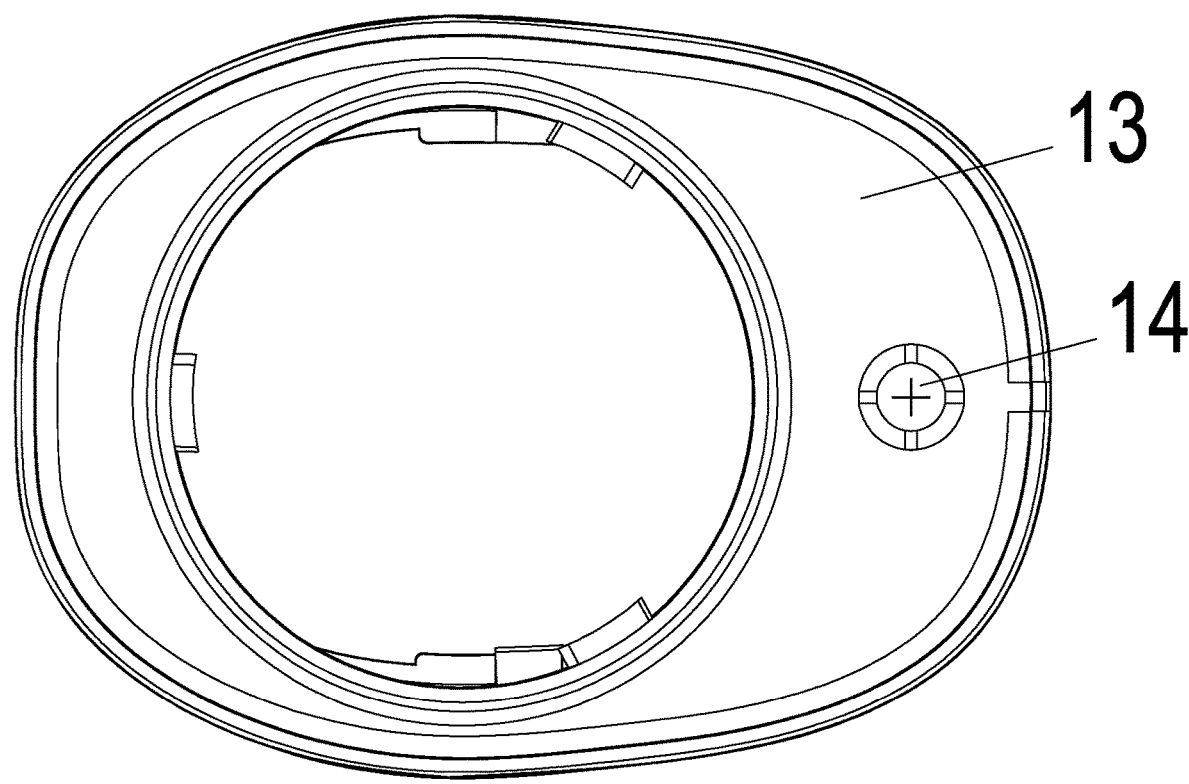
FIG. 3 is a bottom view of the air passable silicone seal.
Figure 4:
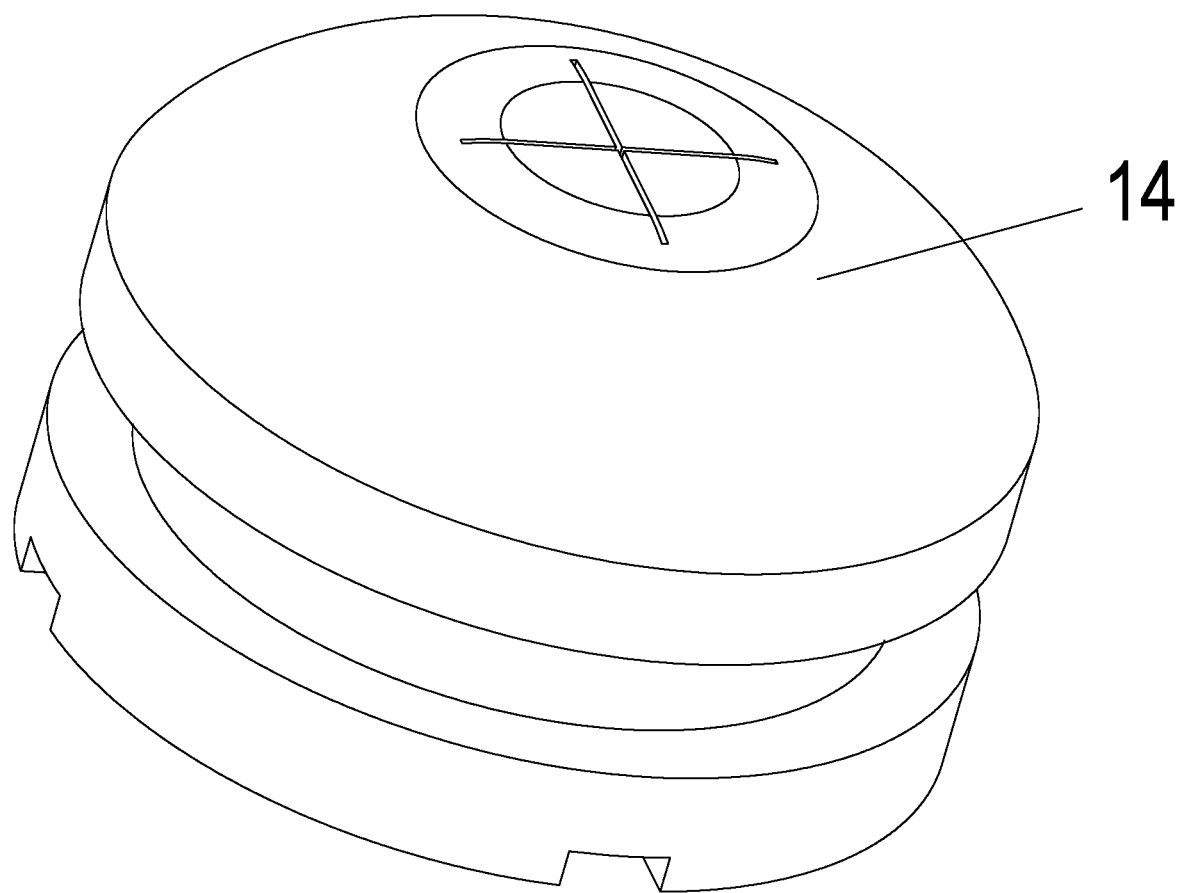
FIG. 4 is a perspective view of the air passable silicone seal.
Figure 5:
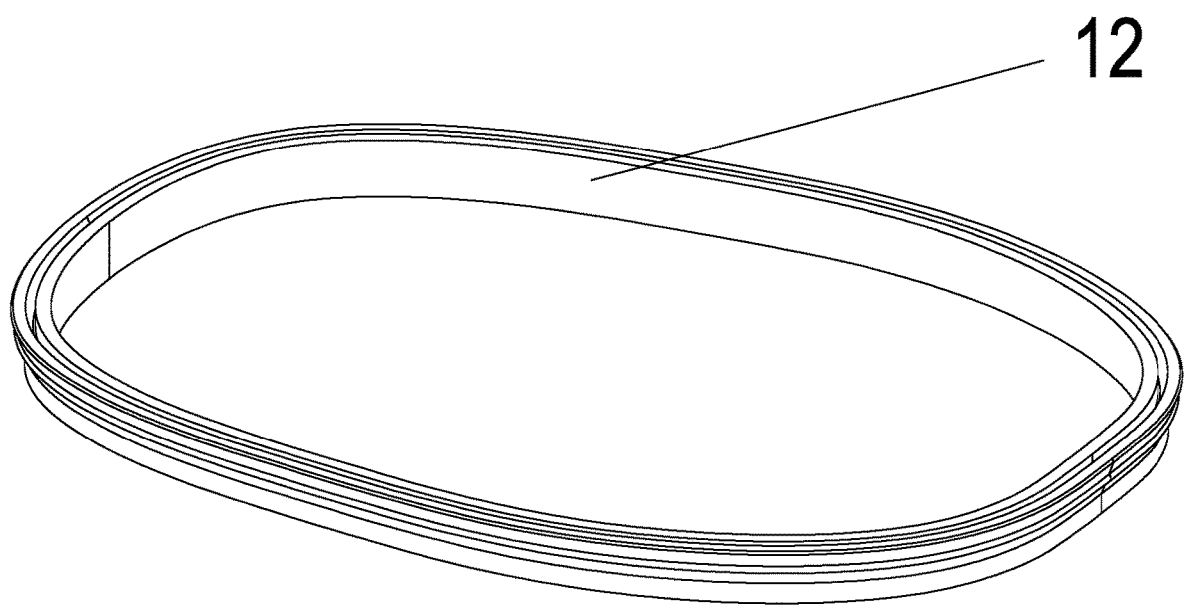
FIG. 5 is a perspective view of the silicone sealing member.
Figure 6:
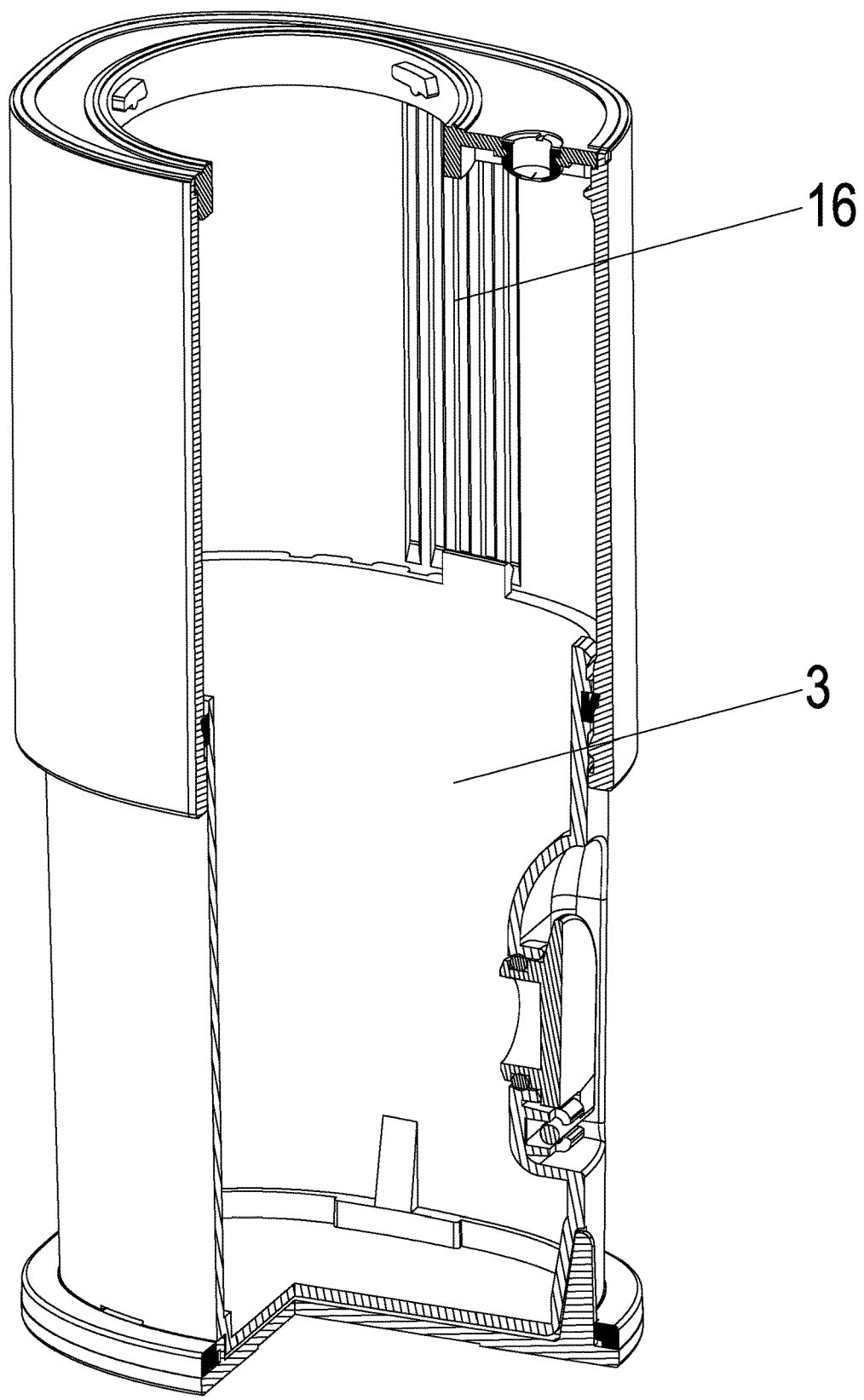
FIG. 6 is a broken-away perspective view of the parallel air troughs.

Referring to FIGS. 1 to 6, a portable oral irrigator in accordance with the invention comprises a nozzle 1; a handle 2; an outer water container 3; an inner water container 4 in which the nozzle 1 is provided at an upper end of the portable oral irrigator, the handle 2 is provided below the nozzle 1, the outer water container 3 is provided below the handle 2, and the inner water container 4 is provided below the outer water container 3; a sealing ring 5 provided at a bottom of the inner water container 4 for sealing the inner water container 4; an annular silicone sealing member 12 provided at a joining portion of the outer water container 3 and the inner water container 4 so that with the provision of the silicone sealing member 12, after adding water to both the outer water container 3 and the inner water container 4 and as a structural characteristic of the silicone sealing member 12, the annular Y-shaped groove on a top of the silicone sealing member 12 expands due to water pressure, and the expanded silicone sealing member 12 adheres to a plastic inner surface of the outer water container 3 to prevent leakage; a gasket 13 provided between the outer water container 3 and the handle 2; and an air passable silicone seal 14 provided on the gasket 13. With the provision of the air passable silicone seal 14, a raised bottom of the air passable silicone seal 14 contracts to close its cross-shaped opening due to water pressure in the outer water container 3, thereby preventing leakage. It is noted that the air passable silicone seal 14 is contracted to urge against the outer water container 3 and in cooperation with the sealing ring 5 so as to prevent leakage.

Specifically, a sealing cap 15 is provided at a joining portion of the nozzle 1 and the handle 2. An inner rim of the sealing cap 15 is provided with silicone to prevent leakage from occurring at the joining portion of the nozzle 1 and the handle 2.

Specifically, the handle 2 includes a curved portion 6 on an outer surface and the curved portion 6 has an anti-slip particles design to increase the friction between the hand and the device. A push button assembly 7 is provided on the handle 2 opposite to the curved portion 6. The push button assembly 7 has from 3 to 5 push buttons of different functions. A plurality of indicators 8 are provided below the push button assembly 7 on the handle 2.

Specifically, the push button assembly 7 has from 3 to 5 push buttons of different functions including, for example, an on/off button, a mode changing button, and a function activation button. The indicators 8 include 5 light-emitting diodes (LEDs) of different colors based on operating states and pressure values of the portable oral irrigator.

For example, the indicators 8 include LEDs for indicating an on/off state of a function, an on/off state of power, and different pressure values.

Specifically, an annular electroplated member 9 is provided on a top of the sealing ring 5 for joining together the sealing ring 5 and the inner water container 4.

Specifically, a water inlet cap 10 is provided on an outer surface of the inner water container 4. The water inlet cap 10 is secured to the outer surface of the inner water container 4 using a hinge. A silicone O-ring 11 is provided at a joining portion of the water inlet cap 10 and the inner water container 4. In detail, the silicone O-ring 11 is provided on an inner surface of the water inlet cap 10 for preventing water in the inner water container 4 from flowing out of the joining portion of the water inlet cap 10 and the inner water container 4.

Specifically, a bottom of the air passable silicone seal 14 is raised to shape as a dome and the cross-shaped opening is provided on the raised bottom of the air passable silicone seal 14. Thickness of the air passable silicone seal 14 is calculated from an edge to a center and is gradually decreased. When the outer water container 3 is full of water, water pressure in the outer water container 3 contracts the dome shaped bottom to close the cross-shaped opening, thereby preventing leakage. For allowing air to enter the outer water container 3, pressurized air expands the dome shaped bottom to open the cross-shaped opening due to difference between pressure in the outer water container 3 and the atmospheric pressure. As such, air is drawn into the outer water container 3. Also, drawing air into the outer water container 3 is required when the oral irrigator operates. Otherwise, water cannot be discharged.

Specifically, four sets of parallel air troughs 16 are provided on an inner surface of the outer water container 3 in which two adjacent sets of the parallel air troughs 16 are spaced apart by 90-degree. The provision of the sets of parallel air troughs 16 facilitates a pulling operation between the inner water container 4 and the outer water container 3.

As stated above, the portable oral irrigator has the following advantageous effects in comparison with the prior art: With the provision of the air passable silicone seal 14, a raised bottom of the air passable silicone seal 14 contracts to close its cross-shaped opening due to water pressure in the outer water container 3, thereby preventing leakage. Further, with the provision of the silicone sealing member 12, after adding water to both the outer water container 3 and the inner water container 4 and as a structural characteristic of the silicone sealing member 12, the annular Y-shaped groove on a top of the silicone sealing member 12 expands due to water pressure, and the expanded silicone sealing member 12 adheres to a plastic inner surface of the outer water container 3 to prevent leakage.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof.

While the invention has been described in terms of preferred embodiments, those skilled in the art will recognize that the invention can be practiced with modifications within the spirit and scope of the appended claims.

What is claimed is:

1. A portable oral irrigator comprising:
   a nozzle;
   a handle;
   an outer water container;
   an inner water container wherein the nozzle is disposed at an upper end of the portable oral irrigator, the handle is disposed below the nozzle, the outer water container is disposed below the handle, and the inner water container is disposed below the outer water container;
   a sealing ring disposed at a bottom of the inner water container for sealing the inner water container;
   an annular silicone sealing member disposed at a joining portion of the outer water container and the inner water container;
   a gasket disposed between the outer water container and the handle; and
   an air passable silicone seal disposed on the gasket.

2. The portable oral irrigator of claim 1, further comprising a sealing cap at a joining portion of the nozzle and the handle wherein an inner rim of the sealing cap is provided with silicone to prevent leakage.

3. The portable oral irrigator of claim 1, wherein the handle includes a curved portion on an outer surface, the curved portion has an anti-slip particles design to increase the friction between the hand and the device; a push button assembly on the handle opposite to the curved portion, the push button assembly having from 3 to 5 push buttons of different functions; and a plurality of indicators below the push button assembly on the handle.

4. The portable oral irrigator of claim 3, wherein the push button assembly has from 3 to 5 push buttons of different functions and the indicators include 5 LEDs of different colors based on operating states and pressure values of the portable oral irrigator.

5. The portable oral irrigator of claim 1, further comprising an annular electroplated member on a top of the sealing ring for joining together the sealing ring 5 and the inner water container.

6. The portable oral irrigator of claim 1, further comprising a water inlet cap on an outer surface of the inner water container, the water inlet cap being hingedly secured to the outer surface of the inner water container; and a silicone O-ring at a joining portion of the water inlet cap and the inner water container, the silicone O-ring being disposed on an inner surface of the water inlet cap.

7. The portable oral irrigator of claim 1, wherein a bottom of the air passable silicone seal is raised to shape as a dome, the air passable silicone seal includes a cross-shaped opening on the raised bottom, and thickness of the air passable silicone seal is calculated from an edge to a center and is gradually decreased.

8. The portable oral irrigator of claim 1, further comprising four sets of air troughs on an inner surface of the outer water container wherein two adjacent sets of the air troughs are spaced apart by 90-degree.

\* \* \* \* \*